Feb. 3, 1970   R. P. DE PUY   3,493,839
REVERSE CURRENT MONITOR
Filed Dec. 26, 1967

INVENTOR:
ROBERT P. DePUY,
BY Albert S. Richardson Jr
ATTORNEY

United States Patent Office 3,493,839
Patented Feb. 3, 1970

3,493,839
REVERSE CURRENT MONITOR
Robert P. De Puy, Cherry Hill, N.J., assignor to General Electric Company, a corporation of New York
Filed Dec. 26, 1967, Ser. No. 693,495
Int. Cl. H02m 1/18
U.S. Cl. 321—12                          13 Claims

ABSTRACT OF THE DISCLOSURE

To detect reverse current in a polyphase electric power rectifier, I provide a monitoring circuit characterized by immunity to false operation when forward current falls to zero at the end of each conducting interval in the respective unidirectional load-current conducting paths of the rectifier. The circuit includes in each of said paths a saturable core current transformer whose hysteresis loop is inclined and whose secondary winding is shunted by a diode that prevents appreciable secondary voltage while there is forward current in the associated primary. In addition, bias means is provided for partially premagnetizing each transformer core in a reverse sense. A current sensitive detector is activated whenever voltage in excess of a predetermined threshold level is induced in the secondary of any current transformer due to reverse current traversing the corresponding primary winding.

---

The need to monitor reverse current is well known in the art of electric power conversion. See, for example, U.S. Patents 2,169,866, Bedford; 2,285,556, Batten, and 2,935,676, Keltz. Where semiconductor valves are used, the presence of reverse current signals a permanent valve failure that must be promptly remedied. The requisite corrective action requires in the first instance an indication that a reserve current condition has occurred, and my invention is particularly useful for this purpose.

While previously known practical schemes for detecting reverse current have been generally satisfactory, they are sometimes subject to false operation when forward load current falls to zero at the end of each normal conducting interval. The seriousness of this problem has grown with increasing current ratings of semiconductor rectifiers. Accordingly, it is a general objective of my invention to provide a reliable current monitoring circuit that is immune to such false operation.

Another object of the invention is the provision of a novel reverse current responsive circuit that is relatively inexpensive to make, small in size, and reliable in operation.

In carrying out my invention in one form, I provide a plurality of current transformers each having a saturable core whose hysteresis loop is inclined and a secondary winding that is shunted by a diode which prevents appreciable secondary voltage while there is forward current in the assoicated primary. Bias means is provided for partially premagnetizing each transformer core in a reverse sense. A current sensitive detector is connected to all of the transformer secondaries in parallel for activation whenever voltage in excess of a predetermined threshold level is induced in the secondary of any transformer due to reverse current traversing the corresponding primary winding.

My invention will be better understood and its various objects and advantages will be more fully appreciated from the following description taken in conjunction with the accompanying drawing in which.

Figure 1:
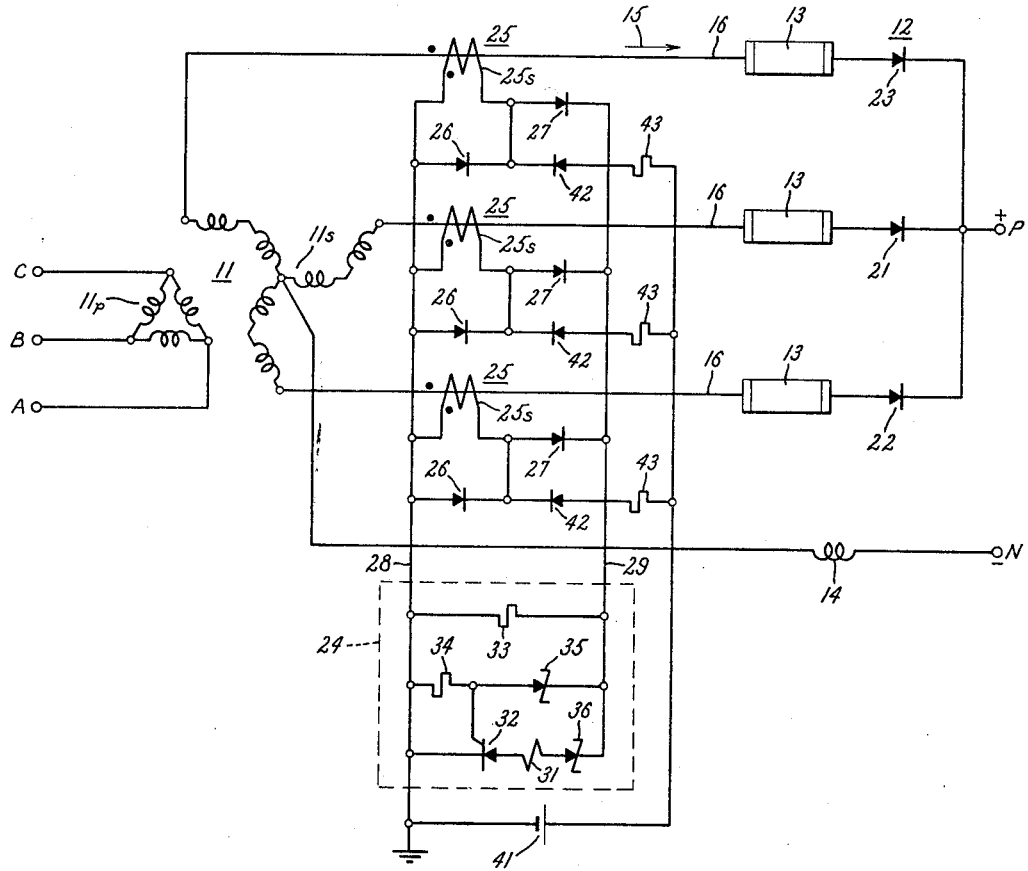
FIG. 1 is a schematic circuit diagram of a 3-phase, half-wave single-way electric power rectifier equipped with a reverse current responsive circuit embodying my invention.

FIG. 1 shows an A-C to D-C electric power converter in which my current monitoring circuit is used to indicate the failure of a load-current conducting valve to block reverse voltage. The converter comprises a power transformer 11, a rectifier section 12, and a set of fuses 13. the primary 11p of the illustrated transformer 11 comprises three delta-connected windings which span the respective terminals of a set of three input terminals A, B, and C adapted to be connected to a suitable source of 3-phase A-C electric power. The transformer secondary 11s comprises six windings connected zig-zag, and the common point of these windings is connected by way of a smoothing choke or reactor 14 to a relatively negative terminal N of a pair of D-C load or output terminals P and N. The rectifier section of the illustrated converter comprises three unidirectionally conducting valves 21, 22, and 23 which connect the load terminal P to the respective phases of the transformer secondary 11s. The three fuses 13 are disposed in series with these valves, respectively. It will be apparent to persons skilled in the art that the power circuit shown in FIG. 1 as so far described is but one of a variety of different converter configurations to which my invention can be usefully applied.

In the foregoing setting, unidirectional electric current is periodically conducted by the valves 21, 22, and 23, in their numbered sequence, to a load circuit (not shown) connected between the terminals P and N. The conventional forward direction of this current is indicated by the arrow 15, and the paths through which the currents flow are labeled 16. While each of the valves has been illustrated as a simple diode, it will be recognized that controlled rectifiers with gate electrodes can alternatively be used. Furthermore, each of the three valves shown symbolically in FIG. 1 and herein referred to in the singular will often comprise a plurality of semiconductor devices suitably arranged for conducting in unison.

If a valve in one of the unidirectional load-current conducting paths 16 should fail to block reverse voltage, reverse current of very high magnitude will begin to flow in that path. In order quickly to provide an indication that such an abnormal condition has occurred, I provide a current monitoring circuit whose preferred embodiment will now be described.

The monitoring circuit comprises detecting means 24 and, for each of the unidirectionally conducting paths 16, a current transformer 25, a parallel diode 26, and a series diode 27. Each of the current transformers 25 has a primary winding, a saturable core, and a secondary winding 25s. The illustrated primary winding has only a single turn which is part of the corresponding path 16 as shown, and it is periodically energized by the forward load current that recurrently flows in that path. Dots have been used in FIG. 1 to indicate the relative polarities of the associated primary and secondary windings of the current transformers 25.

Each of the parallel diodes 26 is connected across a corresponding one of the current transformer secondary windings 25s where it is poled to conduct secondary current when the associated primary is energized by forward load current. So long as the parallel diode is conducting, the voltage across the terminals of the secondary winding cannot exceed the relatively small forward drop of that diode.

By means of a pair of wires 28 and 29 and the respective diodes 27, the detecting means 24 is connected across all of the secondary windings 25s in parallel with one another. Each diode 27 is disposed in series with a corresponding one of the secondary windings 25s between the wires 28 and 29, and this diode is poled to conduct secondary current when current in the associated transformer primary winding is flowing in a reverse direction. In this event, the voltage induced in the involved secondary will appear on the wire 29, and the potential of that wire will then have a positive polarity and an appreciable magnitude with respect to ground. The detecting means 24 is designed to respond to this condition.

The detecting means 24 comprises a current responsive control element 31 which is part of an electro-responsive device (not shown) that will initiate a desired indicating or protective function when the element 31 is activated. This element is connected between the wires 28 and 29 in series with blocking means 32 which will effectively prevent current in the control element 31 until the magnitude of voltage impressed on the wires 28 and 29 attains a predetermined threshold level (for example, 150 volts). A resistor 33 is connected in parallel circuit relationship with the series combination of 31 and 32.

Preferably the blocking means 32 comprises a controlled rectifier as shown, and for purposes of triggering this device its gate electrode is connected to the junction of a resistor 34 and a Zener diode 35 which are serially connected between the wires 28 and 29. The breakdown voltage of the Zener diode 35 corresponds to the desired threshold level of response, and any applied voltage in excess thereof effects triggering of the controlled rectifier 32 which abruptly switches to a low forward impedance state that enables sufficient current to pass through the element 31 to activate the same. Another Zener diode 36 has been inserted in series with the element 31 to prevent seal-in of the controlled rectifier by current from the premagnetizing means to be described below. For this purpose the breakdown voltage of the Zener diode 36 should be slightly higher than the voltage of battery 41 which is appreciably below the breakdown voltage of the Zener diode 35. If desired, the Zener diode 36 can be used as the blocking means 32 in lieu of the illustrated controlled rectifier.

Figure 2:
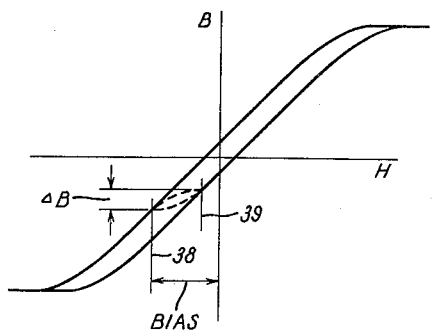
FIG. 2 is a typical magnetization curve of one of the current transformers used in my invention.
Figure 3:
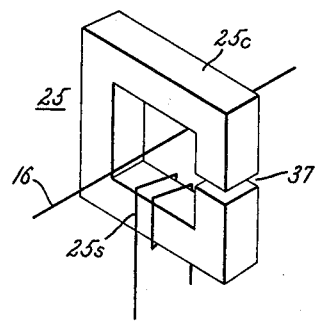
FIG. 3 is a simplified schematic view of the preferred current transformer.

To optimize the performance of my reverse current responsive circuit, I use current transformers 25 having saturable cores that are effectively characterized by hysteresis loops like the one shown in FIG. 2, and I bias these cores by partially premagnetizing them in a reverse sense. The abscissa of FIG. 2 represents magnetizing force (H) which is a function of the mmf. or ampereturns exciting the core of a current transformer 25, while the ordinate represents flux density (B) which is a measure of the EMF inducing property of the magnetic field in that core. The hysteresis loop is seen to have a generally rounded shape with oblique or inclined sides. Preferably this result is obtained by constructing each saturable core (25c) of relatively inexpensive ferromagnetic material having an air gap 37 as indicated in FIG. 3. The low permeability of the air gap skews the loop from an otherwise steeper position. The same result could be obtained by other known means. For example, U.S. Patent 2,889,511, Bedford et al., assigned to the General Electric Company, teaches the use of a non-saturable air-gap reactor in shunt with the bias winding on a conventional square loop core to substantially lower the slope of the magnetization curve.

The premagnetizing means previously referred to provides an initial magnetizing force in the current transformer core having a value approximately as indicated, by way of example, by the vertical line 38 in FIG. 2. This force is insufficient to effect saturation of the core. In the preferred embodiment of my invention, as is shown in FIG. 1, the biasing means comprises a common D-C source 41 (illustrated as a battery whose negative terminal is connected to the grounded wire 28) conductively coupled by a plurality of diodes 42 to the secondary windings 25s of the respective current transformers 25. Current limiting resistors 43 are connected in series with the diodes 42, respectively. The battery 41 and the diodes 42 are so poled that battery current is supplied to each secondary winding in a direction opposite to that of current flowing out of the secondary through the series diode 27. Parameters are selected to produce the desired degree of premagnetization, and for this purpose a relatively low bias current is sufficient. To avoid misoperation due to current circulating from the battery 41 through diodes 42 and 27 to the detecting means 24, the threshold voltage level of the latter component is made higher than the voltage magnitude of battery 41. The illustrated bias can be omitted if desired.

From the foregoing detailed description of the parts and connections of my current monitoring circuit, its mode of opertion may now be readily followed. Under normal operating conditions, the periodic flow of forward load current in the primary of each current transformer 25 cyclically reduces the net magnetizing force acting on the transformer core from the initial value 38 to a value indicated, by way of example, by the vertical line 39 in FIG. 2. The maximum normal excursion of magnetic flux in the core is noted as ΔB. This quantity, which is proportional to volt-seconds, is relatively small because the parallel diode 26 across the secondary winding 25s limits the transformer voltage to a small magnitude during each forward conducting interval.

Following a forward conducting interval, the magnetization of the transformer core is restored to its initial state by the reverse bias means. The resulting minor dynamic loop is indicated schematically by broken lines in FIG. 2. It will be observed that this minor loop does not extend into the first quadrant of FIG. 2, and that consequently there is no tendency for the current transformer to contribute secondary current to the detecting means 24 when its primary current falls to zero at the end of a normal conducting interval. Even if the flux were pushed into the first quadrant by abnormally high forward current in the event of a load fault, the transformer core will remain unsaturated and the amount of voltage induced in the secondary winding 25s by decaying "positive" flux at the end of the conducting interval will not exceed the threshold level to which the detecting means 24 responds. Consequently, my monitor is insentitive to all expectable forward current conditions.

Upon the occurrence of reverse current in any one of the unidirectional paths 16, a relatively high voltage is induced in the secondary winding of the involved current transformer. This voltage will be impressed across the detecting means 24 with the proper polarity and magnitude to trigger the blocking means 32, whereupon secondary current flowing through the series diode 27 will activate the control element 31.

While I have shown and described the preferred form of my invention by way of illustration, many modifications will occur to those skilled in the art. For example, the circuit can be used to monitor current in any number of additional rectifier phases by providing duplicate current transformers and associated diodes for the additional phases. I therefore wish to cover all such modifications as fall within the true spirit and scope of my invention.

What I claim as new and desire to secure by Letters Patent of the United States is:

1. A reverse current responsive circuit comprising:
   (a) a plurality of current transformers each having a primary winding, a saturable core, and a secondary winding, each primary winding being adapted to be periodically energized by electric current flowing in a predetermined forward direction;
   (b) a plurality of parallel diodes connected across the secondary windings of said transformers, respectively, each of said parallel diodes being poled to conduct secondary current when the primary winding of the associated transformer is energized by forward current;
   (c) detecting means; and
   (d) means including a plurality of series diodes for connecting said detecting means across all of said secondary windings in parallel with one another, each of said series diodes being disposed in series with a corresponding one of said secondary windings and being poled to conduct secondary current when current in the associated transformer primary winding is flowing in a reverse direction;
   (e) said detecting means including a current responsive control element arranged to be activated in response to conduction by any one of said series diodes and blocking means in series with said control element for effectively preventing current therein until the magnitude of voltage impressed across said detecting means attains a predetermined threshold level.

2. The reverse current responsive circuit of claim 1 in which said detecting means further includes a resistor in parallel with the series combination of said control element and said blocking means.

3. The reverse current responsive circuit of claim 1 in which said blocking means comprises a controlled rectifier and said detecting means further includes means for triggering said controlled rectifier, the last-mentioned means being connected in parallel with the series combination of said control element and said blocking means and comprising a Zener diode whose breakdown voltage is reached when the magnitude of voltage impressed across said detecting means attains said predetermined threshold level.

4. The reverse current responsive circuit of claim 3 in which a second Zener diode is connected in series with said controlled rectifier, the breakdown voltage of said second Zener diode being appreciably lower than said predetermined threshold level.

5. A reverse current responsive circuit comprising:
   (a) a plurality of current transformers each having a primary winding, a saturable core, and a secondary winding, each primary winding being adapted to be periodically energized by electric current flowing in a predetermined forward direction;
   (b) biasing means for individually premagnetizing the cores of said transformers in a reverse sense, the premagnetizing force being insufficient to cause saturation of the core;
   (c) a plurality of parallel diodes connected across the secondary windings of said transformers, respectively, each of said parallel diodes being poled to conduct secondary current when the primary winding of the associated transformer is energized by forward current;
   (d) detecting means; and
   (e) means including a plurality of series diodes for connecting said detecting means across all of said secondary windings in parallel with one another, each of said series diodes being disposed in series with a corresponding one of said secondary windings and being poled to conduct secondary current when current in the associated transformer primary winding is flowing in a reverse direction;
   (f) said detecting means being activated in response to conduction by anyone of said series diodes.

6. The reverse current responsive circuit of claim 5 in which said biasing means includes a common D-C source and another plurality of diodes which are connected between said source and the secondary windings of the respective transformers to conduct secondary currents in a direction opposite to that conducted by said series diodes.

7. The reverse current responsive circuit of claim 6 in which said detecting means includes a current responsive control element in series with blocking means for effectively preventing current in said control element until the magnitude of voltage impressed across said detecting means attains a predetermined threshold level which is higher than the voltage magnitude of said D-C source.

8. A reverse current responsive circuit comprising:
   (a) a plurality of current transformers each having a primary winding, a saturable core, and a secondary winding, each primary winding being adapted periodically to conduct electric current in a predetermined forward direction;
   (b) a plurality of parallel diodes connected across the secondary windings of said transformers, respectively, each of said parallel diodes being poled to conduct secondary current when the primary winding of the associated transformer is energized by forward current;
   (c) the core of each of said transformers being effectively characterized by a hysteresis loop having inclined sides, and the normal magnitude of current in each primary winding during a forward conducting interval being insufficient to cause saturation of the corresponding core;
   (d) detecting means;
   (e) means including a plurality of series diodes for connecting said detecting means across all of said secondary windings in parallel with one another, each of said series diodes being disposed in series with a corresponding one of said secondary windings and being poled to conduct secondary current when current in the associated transformer primary winding is flowing in a reverse direction; and
   (f) said detecting means being activated in response to conduction by any one of said series diodes.

9. The reverse current responsive circuit of claim 8 in which each core is constructed of ferro-magnetic material having an air gap.

10. The reverse current responsive circuit of claim 8 in which biasing means is provided for individually premagnetizing the transformer cores in a reverse sense, the premagnetizing force being insufficient to saturate the core.

11. The reverse current responsive circuit of claim 8 in which said detecting means includes a current responsive control element in series with blocking means for effectively preventing current in said control element until the magnitude of voltage impressed across said detecting means attains a predetermined threshold level.

12. The reverse current responsive circuit of claim 11 in which biasing means is provided for individually premagnetizing the transformer cores in a reverse sense, the premagnetizing force being insufficient to saturate the core.

13. An improved current monitoring circuit for an electric power converter which comprises a plurality of unidirectional current paths arranged to conduct load current between a set of D-C terminals and a set of polyphase A-C terminals; said monitoring circuit including a plurality of current transformers respectively coupled to said paths, detecting means, and means for connecting said detecting means to the secondary windings of said transformers; wherein the improvement comprises:
   (a) a plurality of saturable cores individually characterized by a hysteresis loop having inclined sides, the secondary windings of said current transformers being wound on said cores, respectively;
   (b) means for partially premagnetizing each of said cores in a sense opposed to the magnetizing force of forward load current in the path to which the associated transformer is coupled; and (c) a plurality of diodes connected across the secondary windings of said transformers, respectively, each of said diodes being poled to conduct secondary current when the corresponding path is conducting forward load current.

References Cited

UNITED STATES PATENTS

| | | | |
|---|---|---|---|
| 2,169,866 | 8/1939 | Bedford | 321—12 X |
| 2,935,676 | 5/1960 | Keltz | 317—43 X |
| 2,969,495 | 1/1961 | Mosch et al. | 317—43 X |
| 3,121,174 | 2/1964 | Schaefer. | |
| 3,396,310 | 8/1968 | Logan | 307—127 X |

LEE T. HIX, Primary Examiner

W. H. BEHA, JR., Assistant Examiner

U.S. Cl. X.R.

307—127; 317—43; 340—253